Dec. 9, 1930.   W. VON DIETERICH   1,784,769
MOLD FOR CASTING SULPHUR
Filed July 23, 1926

W. Von Dieterich
inventor
By: Marks & Clerk
Attys.

Patented Dec. 9, 1930

1,784,769

UNITED STATES PATENT OFFICE

WILHELM VON DIETERICH, OF HONNINGEN-ON-THE-RHINE, GERMANY, ASSIGNOR TO THE FIRM RHENANIA-KUNHEIM VEREIN CHEMISCHEN FABRIKEN AKTIENGESELLSCHAFT, OF BERLIN, GERMANY, A CORPORATION OF GERMANY

MOLD FOR CASTING SULPHUR

Application filed July 23, 1926, Serial No. 124,523, and in Germany February 1, 1926.

This invention relates to a method of manufacturing molded sulphur specially sulphur in bars. Until now molded sulphur was manufactured by casting molten sulphur into wooden molds composed of several parts and moistened with water before casting the sulphur. The crystallization of the sulphur takes place during the cooling of the mold; but this hardening of the molten sulphur affords a comparatively long time as intensive cooling of the wooden molds is not possible. Other disadvantages of the above described method are the difficulty of removing the molded sulphur bodies from wooden molds and the loss of time during the recomposition of the molds decomposed for the removal of the molded bodies.

According to the invention these disadvantages can be avoided by using instead of wooden molds metallic molds whose interior surface is resistant against molten sulphur. Such metallic molds need not to be moistened before casting the sulphur and can be cooled by placing them in water, by spraying water on them or by bringing them in contact with an air current. The crystallization of the molten sulphur affords far less time in metallic molds than in wooden ones. By this quick cooling the crystalline structure of the molded sulphur becomes finer, denser and more equal, thereby improving the molded sulphur bodies. The metallic molds may consist of a metal resistant against molten sulphur as for example aluminum or its alloys; they may also be manufactured from a metal not resistant against molten sulphur when the interior surface of the mold is for example by a metallic coating made resistant against molten sulphur. Aluminum is specially suited for the manufacture of the molds because it has besides its inertness against molten sulphur a high conductivity of heat, thereby easily conducting the heat from the molten sulphur to the cooling agent.

Another improvement of the metallic molds according to the invention may be obtained by providing these molds which for example may be cylindrical or conical tubes with joints which can be filled with plastic or elastic material. The cast sulphur rolls are easily taken out of molds with such joints.

Figure 1:
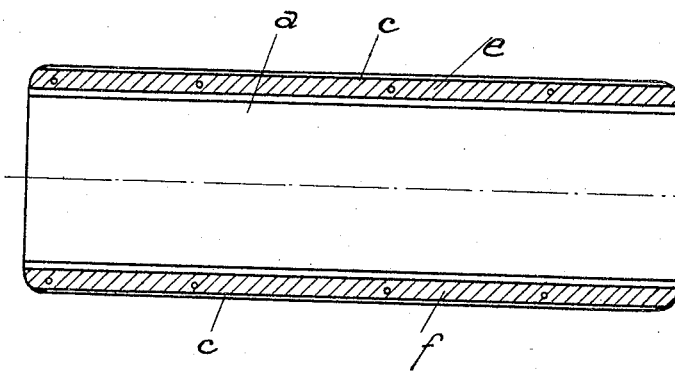
Figure 2:
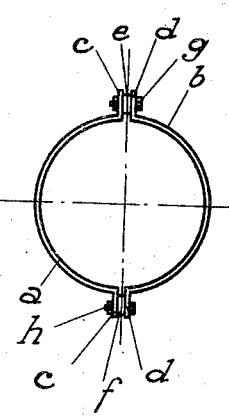
Figure 3:
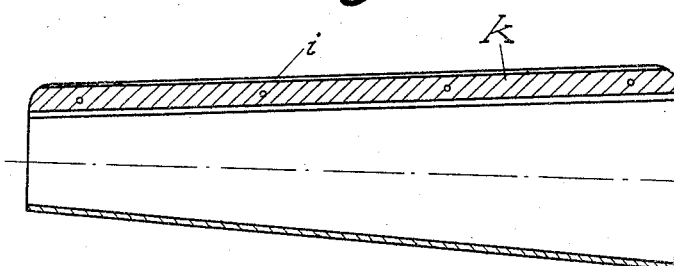
Figure 4:
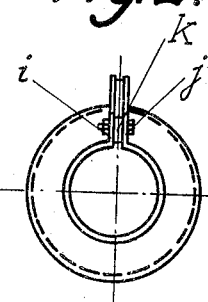
Figure 5:
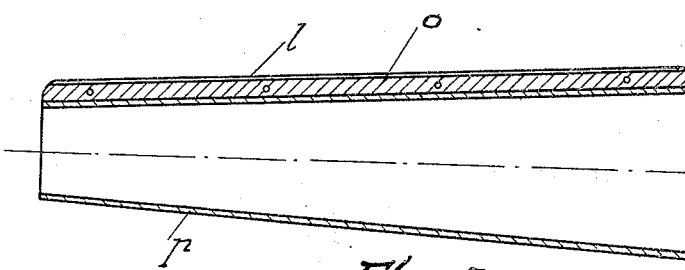
Figure 6:
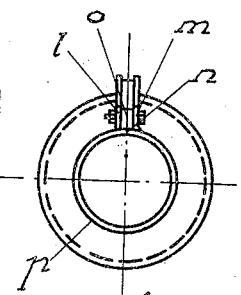

In the accompanying drawing, Figures 1 and 2 are a longitudinal section and an end view of a cylindrical mold in accordance with the present invention. The mold in this case is slit on diametrically opposite sides. Figs. 3 and 4 are similar views of a conical-shaped mold with a longitudinal slit along one side only and with securing flanges along the edges of said slit. Figs. 5 and 6 show similar views to those of Figs. 3 and 4 of a conical mold having a longitudinal slit on one side but where the flanges for drawing the edges together are spaced away from such edges.

The annexed drawings show several molds according to the invention. According to Figs. 1 and 2 the cylindrical or conical mold consists of two half-cylindrical parts $a$ and $b$ provided with flanges $c$ and $d$. Packings $e$ and $f$ of elastic material as for example rubber, asbestos or the like, are arranged between the flanges. The two halves $a$ and $b$ of the mold may be united for example by screws $g$ and $h$ or by braces or the like pushed over the flanges $c$ and $d$. According to Figs. 3 and 4 the conical tube has a joint only on one side. The joint is tightened by an elastic strip $k$ between the flanges $i$ and $j$.

The mold shown in Figs. 5 and 6 has been found specially adapted for casting sulphur. The flanges $l$ and $m$ are arranged some millimeters away from the edges of the joint $n$. Thus the joint $n$ of the mantle $p$ of the mold is even with a big elastic packing $o$ completely closed and the packing is prevented from coming in contact with the molten sulphur.

The molded sulphur can be easily removed from the molds as described. A slight shock to the mold is sufficient without loosening the screws or decomposing the mold as it is necessary when using wooden molds.

The molds described and shown in the drawings are only constructive examples and the invention is not limited to them. Instead of using tubular molds one can also employ case-like or grate-like molds for the manufacture of cast sulphur bodies of the respective forms.

I claim:

1. A metallic mold for casting sulphur comprising a tube made of material resistant to sulphur, said tube having a normally closed slit running the length of the tube, whereby the tube diameter may be increased, and means spaced from the slit to hold the edges of the slit of the tube close together.

2. A metallic mold for casting sulphur comprising a tube made of material resistant to sulphur, said tube having a normally closed slit running the length of the tube whereby the tube diameter may be increased, flanges disposed parallel with the slit, but spaced therefrom, elastic packings between the flanges and means to draw the flanges together, thereby pressing the edges of the slit tightly against each other.

3. A metallic mold for casting sulphur comprising a cylindrical tube made of aluminum, said tube having a normally closed slit running the length of the tube whereby the tube diameter may be increased, flanges disposed parallel with the slit but spaced therefrom, elastic packings between the flanges and means to press the edges of the slit close together.

In testimony whereof I affix my signature.

WILHELM von DIETERICH.